(12) United States Patent
Simon et al.

(10) Patent No.: US 7,773,791 B2
(45) Date of Patent: Aug. 10, 2010

(54) ANALYZING LESIONS IN A MEDICAL DIGITAL IMAGE

(75) Inventors: Richard A. Simon, Rochester, NY (US);
Edward B. Gindele, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 838 days.

(21) Appl. No.: 11/567,857

(22) Filed: Dec. 7, 2006

(65) Prior Publication Data

US 2008/0137921 A1    Jun. 12, 2008

(51) Int. Cl.
*G06K 9/00* (2006.01)
*A61B 5/05* (2006.01)

(52) U.S. Cl. .................. 382/128; 382/224; 600/407

(58) Field of Classification Search ............ 382/100, 382/128, 129, 130, 131, 132, 133, 134, 154, 382/168, 173, 181, 199, 203, 224, 232, 254, 382/274, 282–293, 305, 312; 345/424; 600/407
See application file for complete search history.

(56) References Cited

U.S. PATENT DOCUMENTS

| 5,187,660 | A  | * | 2/1993  | Civanlar et al. ....... 345/424 |
| 5,638,458 | A  | * | 6/1997  | Giger et al. .......... 382/132 |
| 6,731,782 | B2 | * | 5/2004  | Ashton .............. 382/131 |
| 6,901,277 | B2 | * | 5/2005  | Kaufman et al. ....... 600/407 |
| 7,103,224 | B2 | * | 9/2006  | Ashton .............. 382/224 |
| 7,130,457 | B2 | * | 10/2006 | Kaufman et al. ....... 382/128 |
| 7,158,692 | B2 | * | 1/2007  | Chalana et al. ....... 382/294 |
| 7,536,216 | B2 | * | 5/2009  | Geiger et al. ........ 600/407 |

FOREIGN PATENT DOCUMENTS

WO    WO 2006/000953    1/2006

OTHER PUBLICATIONS

Schlathölter et al., "Simultaneous Segmentation and Tree Reconstruction of the Airways for Virtual Bronchoscopy," Proceedings of the SPIE, vol. 4684, Feb. 24, 2002, pp. 103-113, XP002385959.
Sebbe et al. "Model-Guided Segmentation of Opacified Thorax Vessel," Image Processings 2005, IEEE International Conference on Genova, Italy Sep. 11-14, 2005, pp. 25-28, XP010850677.
Bülow et al., "A General Framework for Tree Segmentation and Reconstruction from Medical Volume Data," Lecture Notes in Computer Science, vol. 3216, Sep. 26, 2004, pp. 533-540, XP002385960.

(Continued)

*Primary Examiner*—Seyed Azarian

(57) ABSTRACT

A method of analyzing a lesion in a medical digital image using at least one point contained within a lesion to be analyzed includes propagating a wave-front surface from the point(s) for a plurality of steps; partitioning the wave-front surface into a plurality of wave-front parts wherein each wave-front part is associated with a different portion of the wave-front surface corresponding to a previous propagation step; and analyzing at least one feature associated with each wave-front part to classify anatomical structures associated with the lesion and normal anatomy within the medical digital image.

16 Claims, 15 Drawing Sheets

OTHER PUBLICATIONS

Pitas et al., "Memory Efficient Propagation-Based Watershed and Influence Zone Algorithms for Large Images," IEEE Transactions on Image Processing, vol. 9, No. 7, Jul. 2000, XP011025623.

Kostis et al, Three-Dimensional Segmentation and Growth-Rate Estimation of Small Pulmonary Nodules in Helical CT Images, IEEE Transactions on Medical Imaging, vol. 22, No. 10, Oct. 2003, pp. 1259-1274.

Perchet et al, Advanced navigation tools for virtual bronchosopy, Image Processing: Algorithms and Systems III Proceedings of the SPIE, vol. 5298, 2004, pp. 147-158.

Sethian, J.A., Level Set Methods and Fast Marching Methods, Cambridge University Press, 1999.

* cited by examiner

ANALYZING LESIONS IN A MEDICAL DIGITAL IMAGE

FIELD OF THE INVENTION

The present invention relates to the field of digital imaging, and more particularly to analyzing a lesion in a digital image.

BACKGROUND OF THE INVENTION

Image segmentation is a branch of digital image processing that performs the task of categorizing, or classifying, the picture elements of a digital image into one or more class types. For medical imaging applications, it is common that image segmentation is performed on the voxel (volume element) of a 3-dimensional image data set with the classification types related to anatomical structure. In thoracic medical images, it is convenient to segment the image voxels into classes such as bone, lung parenchyma, soft tissue, bronchial vessels, blood vessels, etc. There are many reasons to perform such a task, such as surgical planning, treatment progress, and patient diagnosis.

Of particular interest is the image segmentation approach generally known as region growing. Starting with a seed point, i.e., a voxel position that is known to be part of a particular class type, a region of contiguous voxels is grown, or developed, about the seed point. The region growing process progresses until a stopping condition is satisfied, e.g., no more contiguous voxels are found, or a predetermined number of voxels have been visited, etc.

The research paper "Advanced navigation tools for virtual bronchoscopy" Image Processing: Algorithms and Systems III Proceedings of the SPIE, Volume 5298, pp. 147-158 (2004), by Perchet et al., describes a region growing image segmentation for tracking the anatomical airway structures in thoracic CT (computed tomography) medical images. As part of the segmentation processing, the bronchi structures are modeled by a graph, or tree based representation. The region growing method described by Perchet et al., includes a branching decision process when the algorithm encounters a bifurcation of the bronchi structure into multiple smaller bronchi structures. The original bronchi structure, or parent, splits into two or more child bronchi structures. The analysis to determine the splitting nature of the bronchi anatomy is performed on the "front propagation," i.e., an advancing surface corresponding to the newly segmented voxels. Thus, during region growing process the parent front propagation surface propagates into two or more child surface fronts.

Pulmonary lesions typically grow within the thoracic pleural cavity. Often cancerous regions, or lesions, in the lung can be identified in CT volume images. However, segmenting the voxels in a thoracic CT image is a difficult task since the voxel values associated with the abnormal lesion tissue are generally in the same numerical range, i.e., Hounsfield units, as many normal anatomical structures, e.g. muscle, heart, and vascular tissue. A shortcoming of many approaches for segmenting pulmonary lesions is the difficulty of differentiating between the lesion and other normal anatomy structures. Often pulmonary lesions in CT images are segmented by a combination of voxel value thresholding and morphological filtering and operations as in the paper "Three-dimensional segmentation and growth-rate estimation of small pulmonary nodules in helical CT images" by Kostis et al., IEEE Trans Med Imaging. 2003 October; 22(10):1259-74. The morphological filtering approach for segmenting pulmonary lesions described by Kostis et al. has difficulty distinguishing between the abnormal lesion tissue and the tissue associated with normal pulmonary structures, such as the cavity that separates the lungs. This cavity contains the heart, large blood vessels, trachea, thymus, and connective tissues.

SUMMARY OF THE INVENTION

It is an object of the present invention to effectively segment an anatomical structure, such as a pulmonary lesion, from the background tissue in a volumetric medical image.

This object is achieved by a method of analyzing a lesion in a medical digital image using at least one point contained within a lesion to be analyzed comprising:

a) propagating a wave-front surface from the point(s) for a plurality of steps;

b) partitioning the wave-front surface into a plurality of wave-front parts wherein each wave-front part is associated with a different portion of the wave-front surface corresponding to a previous propagation step; and c) analyzing at least one feature associated with each wave-front part to classify anatomical structures associated with the lesion and normal anatomy within the medical digital image.

The present invention has an advantage of distinguishing a variety of different anatomical structures within the context of a region growing image segmentation algorithm. In particular, the present invention can distinguish between the structures of pulmonary lesions, pulmonary lesion speculations, blood vessels, and normal solid tissues such as the chest wall or heart.

DETAILED DESCRIPTION OF THE INVENTION

Figure 1:
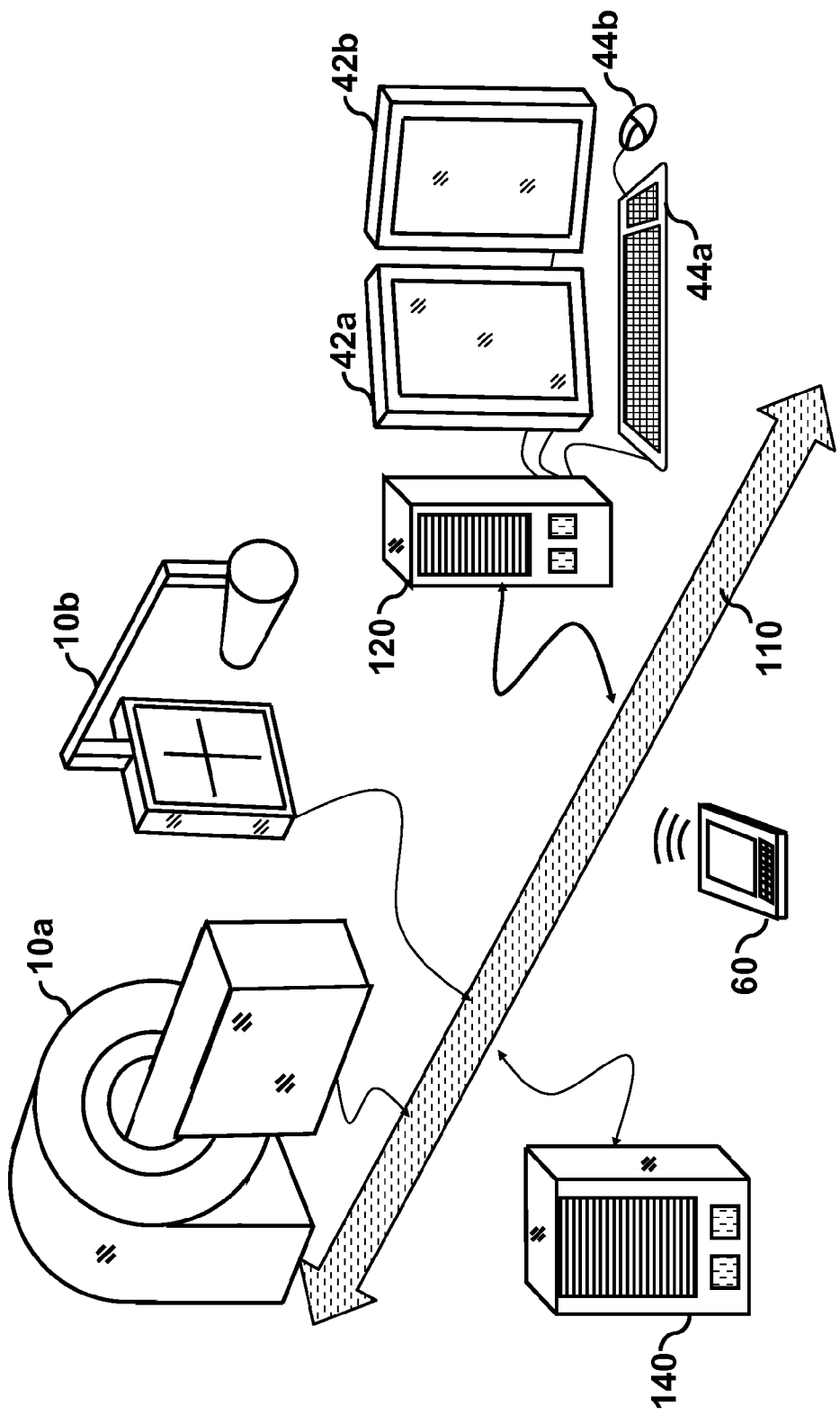
FIG. 1 is a diagram showing a medical imaging communications network of connected computers suitable for practicing the present invention.

Many medical imaging applications are implemented via a picture archiving and communications systems (PACS). These systems provide a way for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain slightly different diagnostic information. In particular, CT and MR images when viewed and studied by radiologist, can reveal much detail about a patient's 3-dimensional internal anatomy. Computer algorithm technology can also be applied to medical images to enhance the rendering of the diagnostic information, to detect an abnormal condition, i.e., computer aided detection (CAD), and to make measurements relating to the patient's condition, i.e., computer aided measurement (CAM).

The present invention represents an algorithmic computer method for segmenting a portion of a medical image with anatomical relevance. In particular, the primary motivation for the development of the technology described herein is the segmentation of abnormal pulmonary lesion tissue from normal tissue. An intended use for the herein described technology is as follows. A radiologist reviews a thoracic CT exam on a medical PACS and indicates to the CAM segmentation software the position of a suspected pulmonary lesion. Alternatively, the position of a suspected lesion can be supplied from an automatic nodule detection algorithmic method. The voxel position indicated represents a seed point assumed to be part of the pulmonary lesion. The CAM segmentation software then identifies voxels surrounding and contiguous with the seed point that are part of the pulmonary lesion. Once the region associated with the pulmonary lesion has been segmented a corresponding volumetric size can be calculated. The technology advancement of the present invention relates to the particular method of performing the image segmentation task.

In the following description, a preferred embodiment of the present invention will be described as a software program. Those skilled in the art will readily recognize that the equivalent of such software can also be constructed in hardware. Since image processing and manipulation algorithms and systems are well known, the present description will be directed in particular to algorithms and systems forming part of, or cooperating more directly with, the method in accordance with the present invention. Other aspects of such algorithms and systems, and hardware and software for producing and otherwise processing the image signals involved therewith, not specifically shown or described herein can be selected form such systems, algorithms, components, and elements known in the art. Given the description as set forth in the following specification, all software implementation thereof is conventional and within the ordinary skill in such arts.

A system suitable for practicing the present invention is illustrated in FIG. 1 showing a medical imaging communications network that includes multiple connected computers. Such a network of computers provides a way of sending and receiving information between any two or more connected computers. Medical digital images are generated by imaging a patient (not shown) with a capture device. An image capture device 10a symbolically represents a number of medical digital image modality devices such as, but not limited to, a computed tomography scanning device (CT) or Magnetic Resonance imaging scanning device (MR) that are capable of producing 3-dimensional digital images of patient anatomy.

A patient is positioned on a movable table within the capture device assembly such that the patient can be moved relative to the signal source of the capture device. The capture device receives the signals that have passed through the patient in raw form, processes these signals, and produces a slice digital image. Each slice digital image represents a cross-sectional, or slice, through the patient anatomy. A slice image series can be generated by repositioning the patient relative to the source signal and acquiring other slice digital images relating to different cross-sections through the patient. A slice image series, assembled in proper order, can represent the full 3-dimensional volume of an imaged patient.

Also connected to a communications network 110 is a digital radiographic (DR) capture device 10b capable of producing digital x-ray images. As such, the images produced by a DR capture device typically are one or more 2-dimensional digital images each representing a different exposure and or imaging path through the patient. For example, the DR capture device 10b can be used to acquire multiple projection radiographic digital images with its x-ray source located in different positions relative to the patient. The resulting DR radiographic digital images can be processed to produce a set of tomosynthesis slice digital images that represent a 3-dimensional digital image of the patient.

The slice digital images (not shown) produced by the capture device 10a are transmitted via the communications network 110 to an image archive computer 140 where, along with patient history information, they become part of an electronic patient history record. The main function performed by the image archive computer 140 is the facilitation of transfer or exchange of image information rather than the processing of information. The image archive computer 140 serves as a large storage repository of digital images and other, but unspecified, medical information. The arrows in the diagram of FIG. 1 represent the exchange of information, which in general, is bi-directional i.e.; the flow of information can be in either direction.

The slice images are later queried on a diagnostic workstation computer 120, sometimes referred to as a PACS (Picture Archive and Communication System), for viewing and examination by a radiologist or similarly trained medical professional. The diagnostic workstation computer 120 can have multiple electronic displays connected for viewing medical images. Two such electronic display devices 42a and 42b are shown in FIG. 1. Also connected to the diagnostic workstation computer 120 are input devices 44a and 44b depicted here as keyboard and mouse devices respectively. Although the technology of the present invention was envisioned as operating within the context of a diagnostic workstation computer, it should be noted that any computing device capable of displaying and processing image data can be used. In particular, a mobile computer 60 shown in FIG. 1 can be used with the present invention. Thus it is not necessary for the computer to be physically connected to the communications network 110.

A PACS (Picture Archive and Communication System) can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but is not limited to, non-image information (meta-data) such as age, sex, medical history, prescribed medications, symptoms, etc.

For the purposes of the discussion of the present invention the collection of inter-connected computers including the communications network will be also be referred to as a DICOM network since DICOM (Digital Imaging and Communications in Medicine PS 3.3-1999, National Electrical Manufacturers Association, 1999) formatted digital images are currently is the industry standard and the most prevalent file encoding used for medical digital images. Typically a 3-dimensional volume image is constructed from set of 2-dimensional slice digital images wherein each slice digital image is encoded as an individual DICOM file.

Often an individual digital image data element, i.e., single value representing a measured image signal intensity, is referred to as a for 3-dimensional images and a pixel for 2-dimensional images. The term voxel is commonly used to characterize a volume-element whereas the term pixel is commonly used to characterize a picture-element. The technology embodied within the present invention can be applied to 2-dimensional and 3-dimensional images. As such, for the purposes of the description herein, the terms voxel and pixel should be considered interchangeable, i.e., describing an image elemental datum capable of having a range of numerical values. Voxel and pixels can be said to have the attributes both of location and value.

With the medical imaging system setup as described above and shown in FIG. 1, a medical professional such as a radiologist (not shown), uses the keyboard 44a or mouse 44b to indicate to a software application program 150 (shown in FIG. 2), running on the diagnostic workstation computer 120, the desired patient record (not shown) to be loaded into memory. The CT digital image exam, i.e., the set of CT slice digital images, is then retrieved from the image archive computer 140 and displayed on the electronic display devices 42a and 42b. After viewing the image data, the medical professional indicates to the system the location of a suspected pulmonary lesion with a click of the mouse, input device 44b. Typically this is performed by scrolling through the 2-dimensional slices digital images, one at a time, and viewing the slice digital image that best shows the suspected pulmonary lesion.

The term lesion can be defined in medical dictionaries as "any pathological or traumatic discontinuity of tissue or loss of function of a part". For the purposes of the discussion presented herein, focal (localized) lesions are of greatest interest, i.e., abnormalities that can be visually attributed to a localized domain. Some technical presentations use the term lung nodule or pulmonary nodule interchangeably with the term pulmonary lesion. Although the term nodule can be defined in medical dictionaries as "a small lump, swelling or collection of tissue" the discussion here will treat the term nodule as a subset of the lesion. As the following discussion of technology will illuminate, the present invention is designed to work with lesions of general nature as well as smaller nodular lesions.

Figure 2:
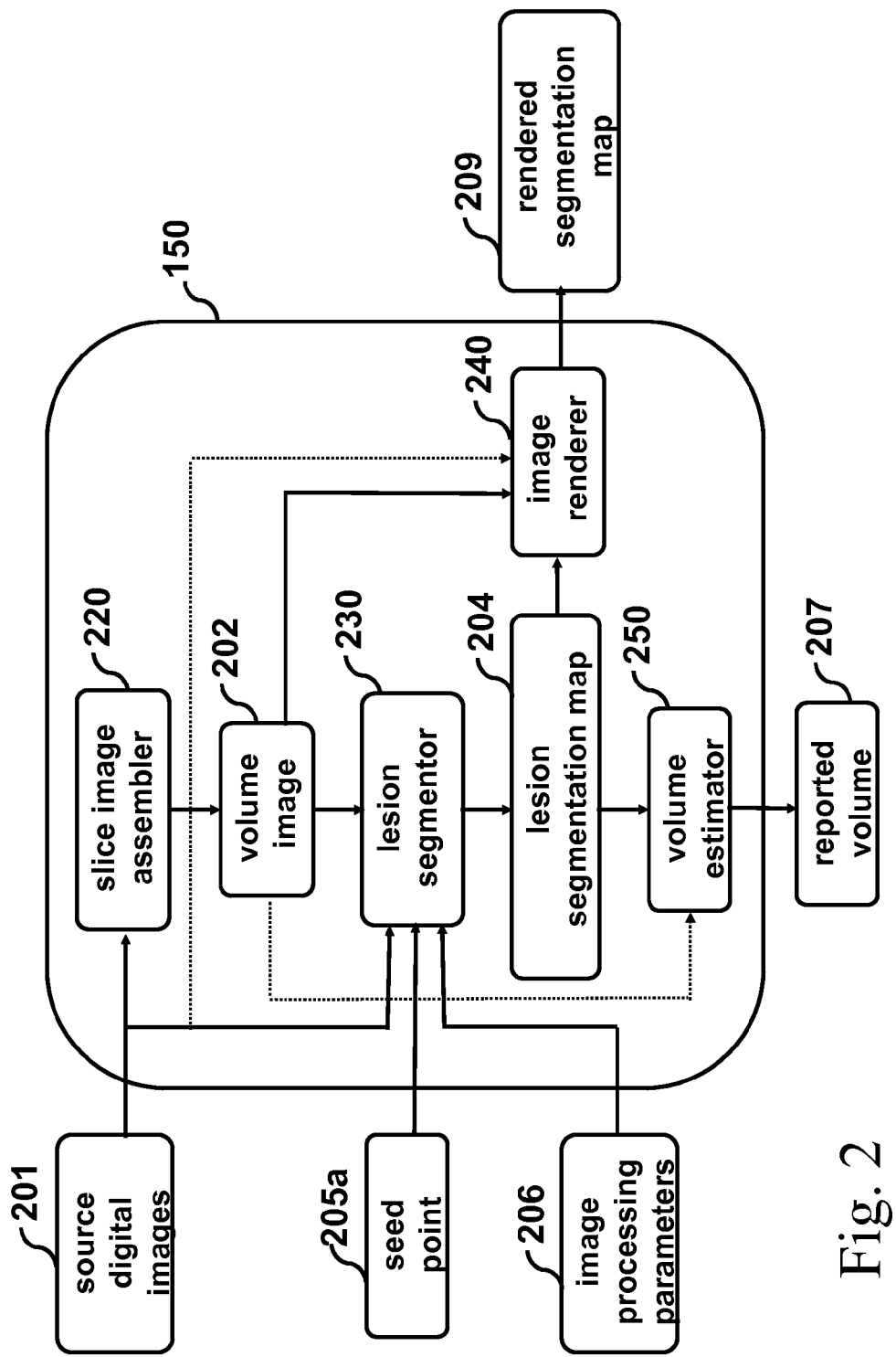
FIG. 2 is block diagram showing the details of the software program running within the diagnostic workstation computer.

An overview of the flow of image information into, out of, and within software application program 140 is depicted by FIG. 2. The software application program 140 receives a set of source digital images 201, a seed point 205, and an image processing parameters 206 and produces a reported volume 207, a segmentation map 204, and alternatively, a rendered segmentation map 209. Within the software application program 140, the following analysis and processing is performed. A slice image assembler 220 receives the multiple images as the set of source digital images 201 and generates a volume image 202. The volume image 202, the image processing parameters 206, and the seed point 205 are then passed to a lesion segmentor 230. The volume image 202 provides imaging voxel data regarding the 3-dimensional nature of the patient anatomy. The image processing parameters 206 contain multiple data items that regulate, or control, the actions of the lesion segmentor 230 and a volume estimator 250. The seed point 205a communicates location of a suspected pulmonary lesion. The lesion segmentor 230 generates the segmentation map 204, i.e., volume image data that indicates, on a voxel by voxel basis, the segmentation classification information as to whether or not each voxel is considered part of the segmented lesion. The volume estimator 240 receives the segmentation map 204 and the volume image 202 and generates the reported volume 207, i.e., a numerical value or values corresponding to the size, e.g., $mm^3$, of the suspected lesion.

As an option, an image renderer 240 receives the volume image 202 and lesion segmentation map 204 and generates the rendered segmentation map 209. A radiologist or other medical professional can display the rendered segmentation map 209 on one of the display devices 42a or 42b. In so doing, the medical professional can visualize the geometry of the suspected lesion in relation to patient's normal anatomy. Both the rendered segmentation map 209 and volume image 202 can be visualized in a 2-dimensional presentation (slice presentation) or in a 3-dimensional presentation (volume rendering presentation) such as the method described in U.S. Pat. No. 5,187,660.

Pulmonary lesion size is considered a valuable diagnostic quantity. In particular, nodule size correlates with the probability that a nodule represents cancerous tissue. The volume estimator 250 (shown in FIG. 2) receives the lesion segmentation map 204 and calculates an estimated size for the segmented lesion. In the simplest form of the calculation, a census of voxels included in the lesion segmentation map 204 scaled by the physical space a voxel represents, usually in terms of $mm^3$, is the size of the segmented lesion. The voxel spacing, in the x and y-directions, can be obtained from the meta-data contained in the DICOM header of one of the source digital images 201. The average voxel spacing in the z-direction can be calculated from the z-location meta-data from the upper-most and lower-most slices of the set and dividing by the total slices minus one. Physicians have historically analyzed the size of lesions and nodules on the basis of diameter—usually by visual inspection of medical images in a 2-dimensional presentation. Accordingly, the volume estimator 250 can also calculate an "effective diameter" as the reported volume 207 by taking the cube root of the estimated volume in cubic mm. This feature enables the radiologist to compare the results of the volumetric image segmentation process with those obtained through traditional methods.

Many examples of CT volume images have anisotropically sampled voxel data, i.e., the voxel spacing in the x, y, and z-directions is not equal. Typically, the x and y-direction voxel samples are equally spaced and the z-direction voxel spacing is somewhat greater The set of source digital images 201 can be interpolated in the z-direction such that the voxel image data is isotropically resampled. The software application program 150 can then be operated on the resampled source digital images yielding a reported volume based on isotropic data.

Although the technology of the present invention was designed, developed and tested with a user providing the seed point 205a for the starting point of the image segmentation processing, those skilled in the art will appreciate that there are other methods of identifying seed points that can be used to good effect. In particular, any computer aided detection (CAD) algorithm that is designed to automatically identify the location of suspected nodules, such as the method described in U.S. Pat. No. 5,638,458, can be used to provide the seed point 205a.

Figure 3:
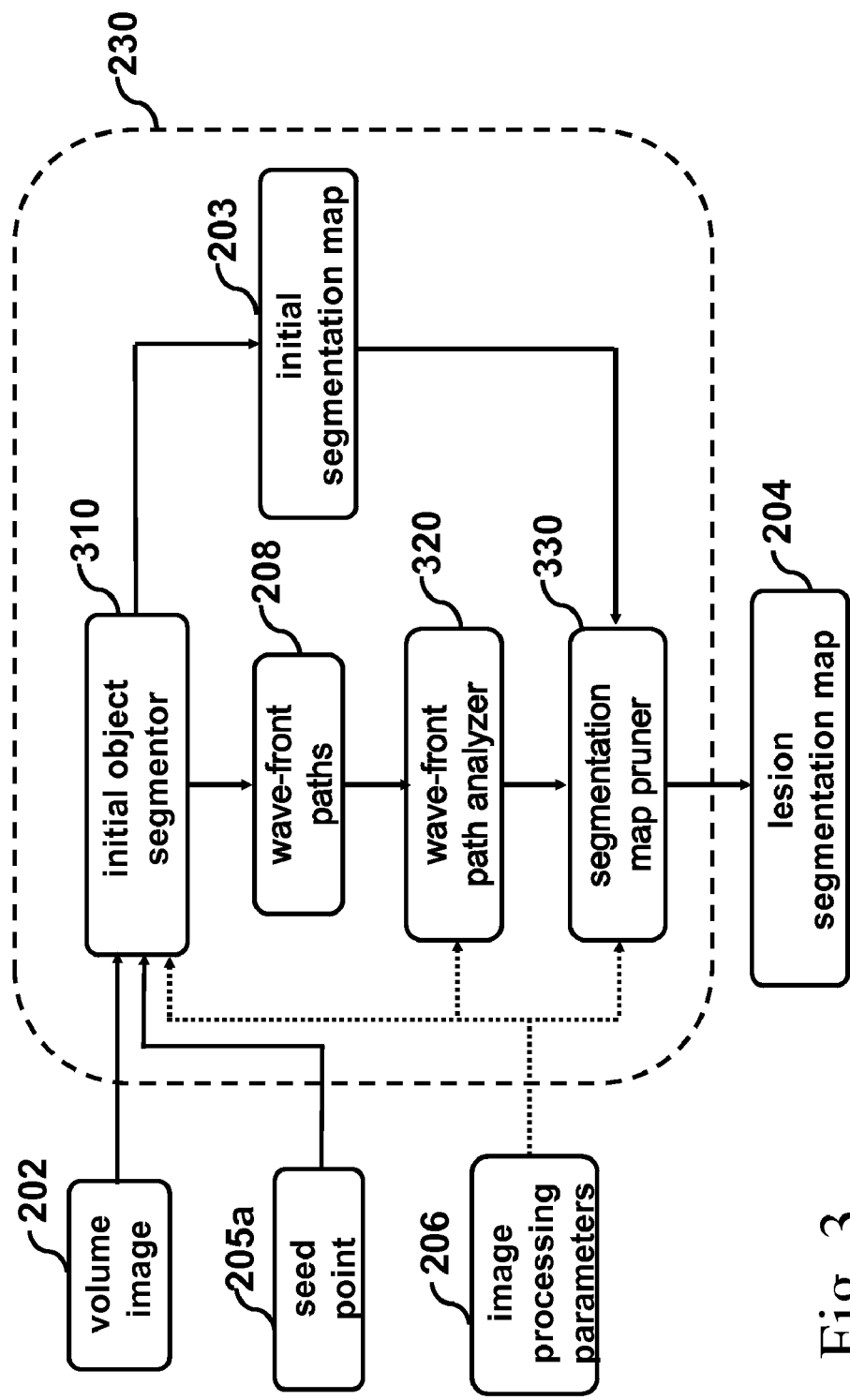
FIG. 3 is block diagram showing the details of the lesion segmentor.

The details of the lesion segmentor 230 shown in FIG. 2 is depicted in more detail in FIG. 3. The lesion segmentor 230 produces, on output, the lesion segmentation map 204 that represents the voxels identified as part of the pulmonary lesion. An initial object segmentor 310 receives the volume image 202, seed point 205a and image processing parameters 206 as input and produces the wave-front paths 208 and the initial segmentation map 209. The image processing parameters 206 are a set of control parameters used to regulate the overall segmentation processing. The seed point 205a indicates an x,y,z location (typically as a set of i,j,k indices) of a suspected pulmonary lesion within the volume image 202. It is about this voxel location that the initial object segmentor 310 performs a first segmentation process. (Optionally, the location of the seed point can be automatically adjusted to ensure the segmentation result is independent of the seed point location; as long as the seed point is inside the lesion.) The initial segmentation map 209 represents a first-attempt classification of voxels, by the initial object segmentor 310, for voxels classified as part of the pulmonary lesion. A wave-front path is a collections of voxels that represent a connected region-growing sequential path that is generated as part of the region growing processing. The wave-front paths 208 is a catalog of all the individual wave-front paths. A wave-front path analyzer 320 receives the wave-front paths 208 and classifies each individual wave-front path as associated with a particular anatomical structure. Further refinement of the segmentation processing is performed by a segmentation map pruner 330 using both the wave-front paths 208 and the initial segmentation map 209. Those voxels associated with non-lesion anatomy structures, as classified by the wave-front path analyzer 320, are pruned, or removed, from the initial segmentation map 209. The lesion segmentation map 204 incorporates these refinements. Thus, the lesion segmentor 230 produces a lesion segmentation map 204 that identifies voxels deemed to be part of the lesion tissue based on the analysis of the wave-front paths 208.

Figure 4:
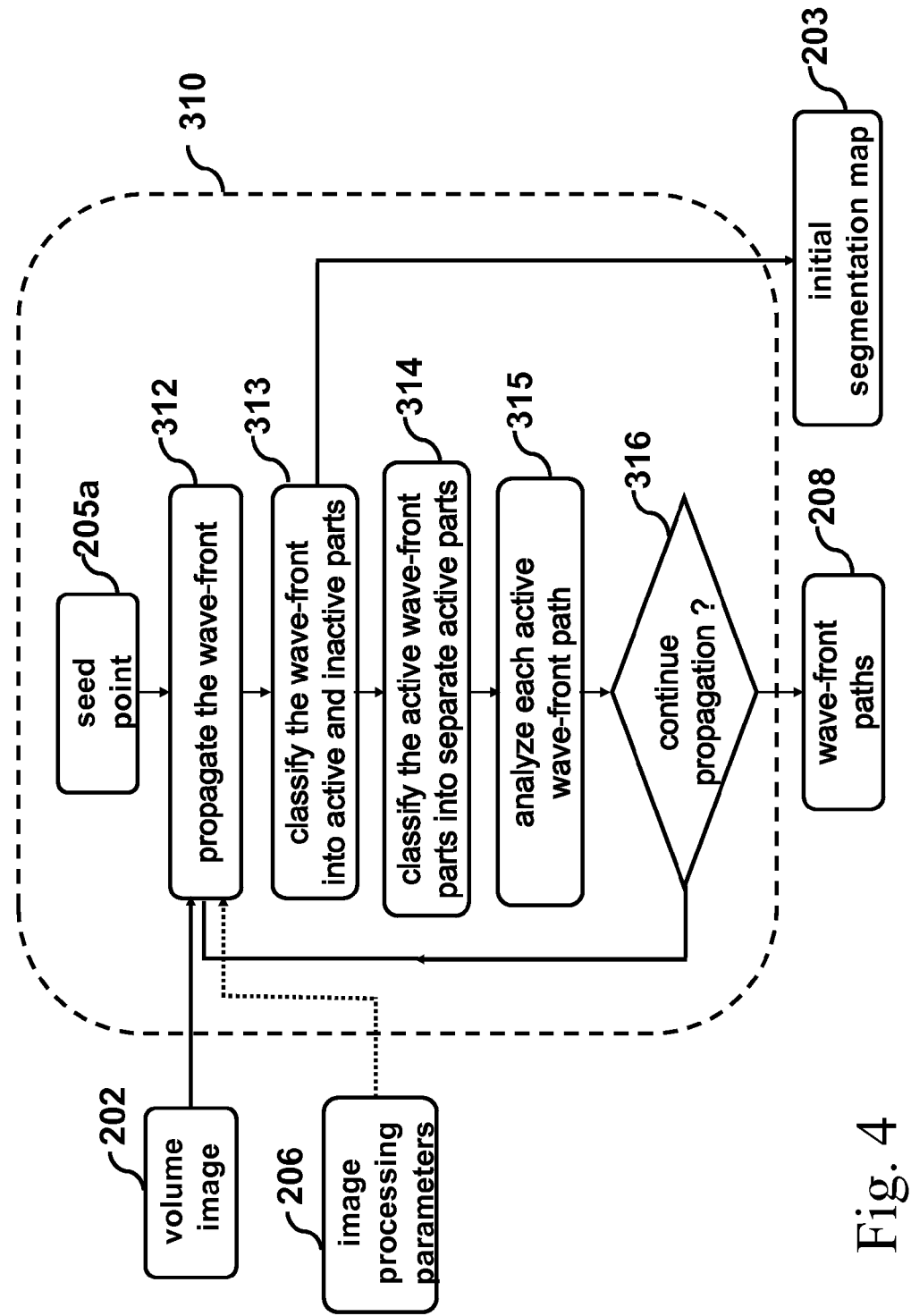
FIG. 4. is block diagram showing the details of the initial object segmentor.

The details of the initial object segmentor 310 shown in FIG. 3 are illustrated in more detail in FIG. 4. The current active wave-front contain the set of voxels from which further region growing can be initiated. As described above, the segmentation processing starts with the seed point 205a, the location of the suspected pulmonary lesion, as the current active front. In a propagate the wave-front step 312, the segmentation processing continues from the set of voxels that constitute the current active wave-front wherein voxels are evaluated according to segmentation criteria, i.e., a set of logical rules that determine if a voxel should be included in the segmentation map. Since an initial segmentation map 203 is modified iteratively within the processing of the initial object segmentor 310, it is convenient to refer to the unfinished form as the current segmentation map. At this stage in the processing, the set of voxels included in the current segmentation map constitute a 3-dimensional volume.

In region growing algorithms, the processing can start with a point or collection of points. In either case, new voxels are added to the previously segmented voxels (classified), either one-at-a-time or a set of voxels at a time. (The present invention can be used with either type of region growing method). Within the propagate the wave-front step 312, (especially for the one-at-a-time region growing method) preferably many iterations of adding new voxels to the current segmentation map are performed. The number of voxels added to the segmentation map during a propagation step is controlled by D1; a parameter in the image processing parameters 206. The voxels added during the propagation step are associated with the current wave-front. In a preferred implementation, D1 represents an increment in the path-length traveled from the current wave-front to the voxels currently under consideration.

After the propagate the wave-front step 312 the set of voxels connected to the previous segmented voxels constitute a wave-front surface from which further region growing can be initiated. In an alternative implementation of the invention, the wave-fronts contain the segmented voxels that constitute the boundary between segmented and non-segmented voxels. In a classify the wave-front surface into active and inactive parts step 313, the set of voxels that constitute the current wave-fronts are classified into active and inactive categories. Inactive voxels are voxels in which no further growth of the segmentation can occur according to the segmentation criteria. Voxels that can initiate further growth, i.e., voxels that can be incorporated into the segmentation map, are considered "active".

The active voxels represent the wave-front surface of the region growing process. However, the set of active voxels do not necessarily constitute a contiguous region, i.e., they are not all connected to each other. In a classify the wave-front parts into separate parts step 314, the set of active voxels and the set of inactive voxels representing the overall wave-front surface are further classified, or partitioned, into separate parts, a plurality of wave-front parts, wherein the voxels of each wave-front part are connected. Each separated wave-front part is given a unique label. Starting with an arbitrary active(inactive) voxel v1, a connected component analysis is performed on the set of active(inactive) voxels. All voxels within the set of active voxels adjacent to v1 or adjacent to voxels adjacent to v1 (and therefore connected) are identified as part of the same wave-front part #1. After identifying all the connected voxels to v1, a v2 voxel is arbitrarily chosen from the set of remaining active(inactive) voxels. In similar fashion, all of the voxels connected to v2 are identified as belonging to a new wave-front part #2. This process is repeated until all voxels in the set of active(inactive) voxels are identified and associated with a particular wave-front part.

When the classify the wave-front parts into separate paths step 314 is performed, each identified wave-font part is associated with an identified wave-front part from the previous loop. Initially, the overall wave-front surface starts out as a single wave-front part, e.g. #1. At some later iteration pass, the overall wave-front surface is no longer a set of connected voxels and thus there become a plurality new wave-front parts, e.g. #2 and #3. Therefore, the total collection of wave-front parts can be organized in a tree structure wherein each individual wave-front part has a parent wave-front part and many have one or more child wave-front parts. Each segmented voxel in the current segmentation map is associated with a labeled wave-front. Voxels that were added during the propagate the wave-front step 312 that were not part of a labeled wave-front part are associated with the parent wave-front part. Alternatively these voxels can be associated with the child front of the parent. These voxels correspond to the volume that is between two successive wave-front parts. A wave-front path is the list of distinct wave-fronts parts traversed starting from the seed point 205a in which successive wave-fronts parts are linked together by a parent child relationship and which is terminated by a wave-front part (terminal wave-front) who does not posses a child wave-front part. There is one unique wave-front path between the seed point 205a and each terminal wave-front part. The collection of the these paths constitutes the wave-front paths 208. Thus, each wave-front part of a wave-front surface is associated with a portion of the wave-front surface corresponding to a previous propagation step.

Figure 5A:
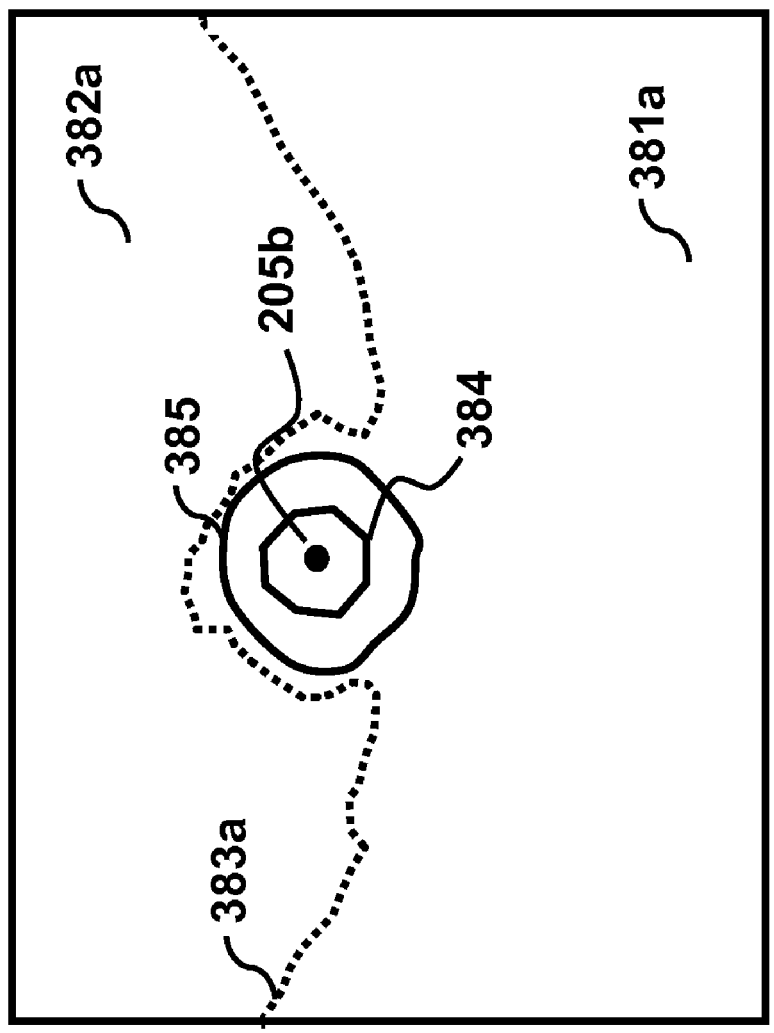
FIG. 5a is a diagram showing the wave-front parts generated by the region growing processing.
Figure 5B:
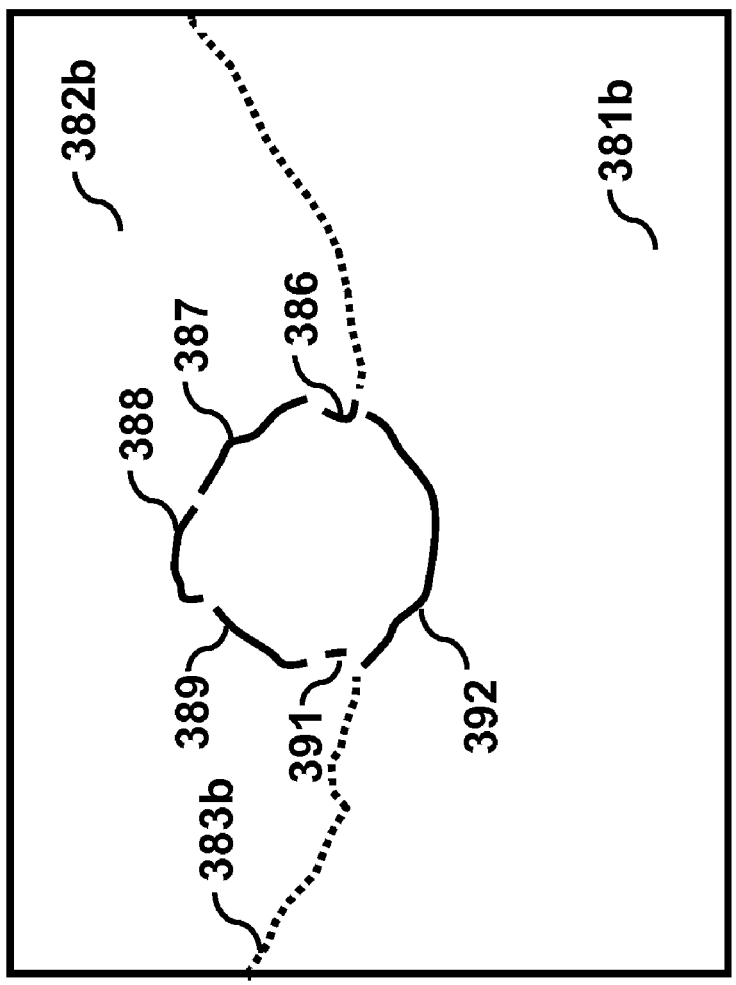
FIG. 5b is a diagram showing the wave-front parts generated by the region growing processing.
Figure 5C:
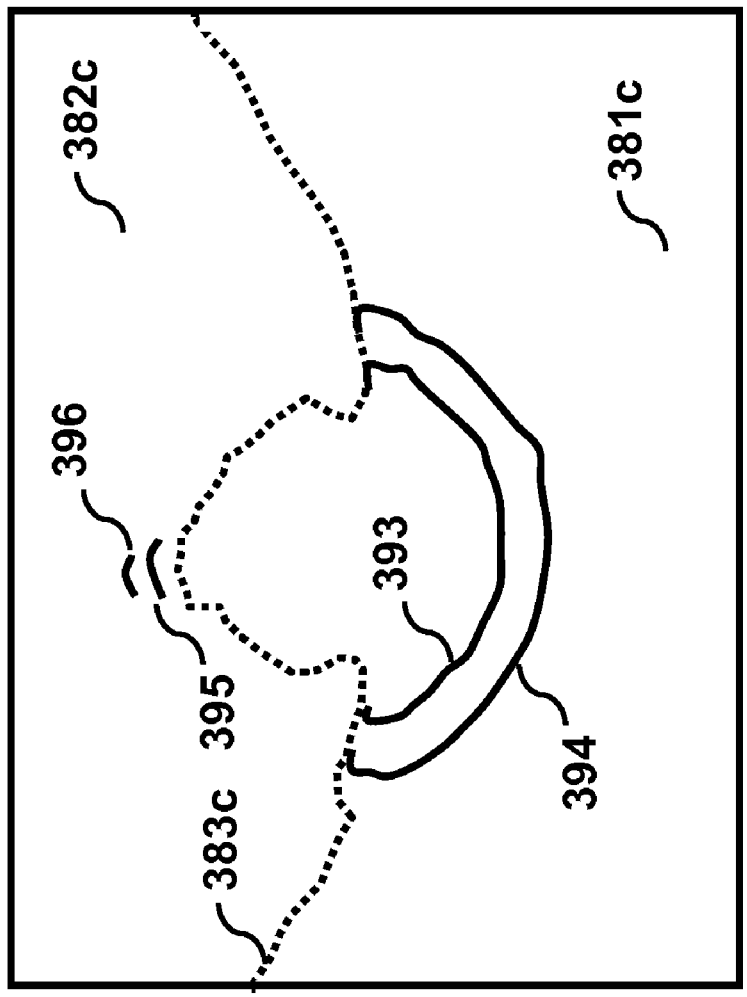
FIG. 5c is a diagram showing the wave-front parts that are generated in later loops through the region growing processing.
Figure 5D:
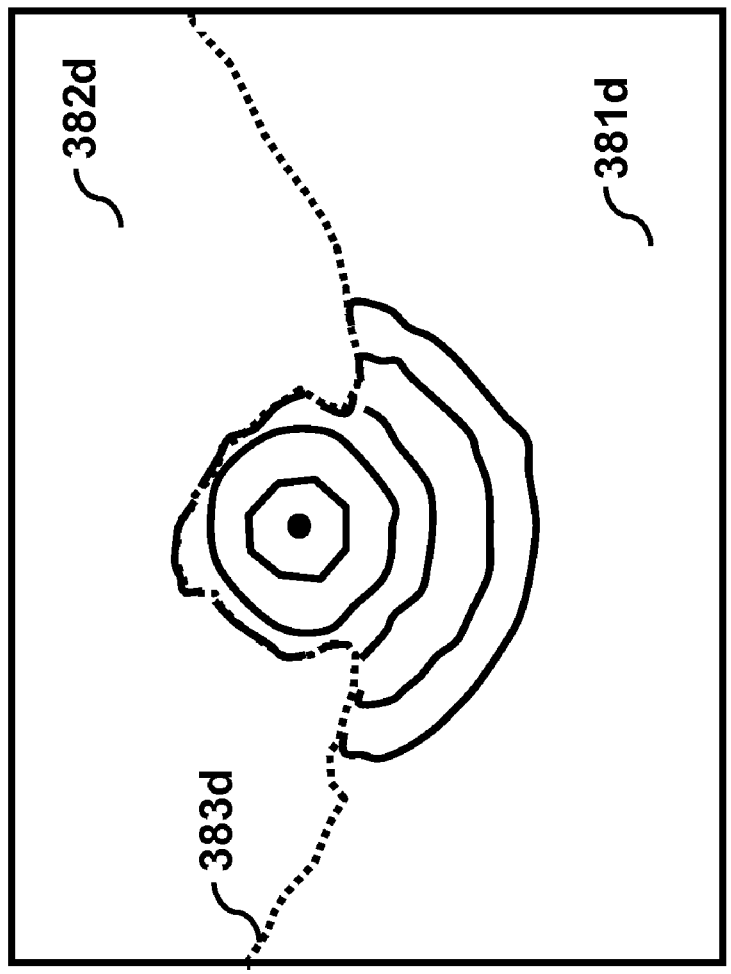
FIG. 5d is a diagram showing all of the wave-fronts generated as part of the region growing processing.

The diagram shown in FIG. 5a depicts a 2-dimensional projection view of the wave-front parts generated as part of three 3-dimensional region growing processing. A seed point 205b is shown in roughly the center of the suspected lesion. A chest wall 381a and a lung parenchyma 382a are shown separated by the pulmonary parietal pleural membrane shown as dotted line 383a (these structures are similarly labeled in FIGS. 5b, 5c, and 5d as 381b, 382b, 383b, 381c, 382c, 383c, 381d, 382d, and 383d respectively). The wave-front part 384 represents an early region growing wave-front surface that is fully connected, i.e., the entire current wave-front surface is represented as a single wave-front part. A wave-front part 385 represents a similar structure at a later loop through the region growing processing described above. FIG. 5b shows the wave-front parts that are generated in a later loop through the region growing processing. At this stage, the wave-front surface is represented by multiple wave-front parts 386, 387, 388, 389, 391, and 392. FIG. 5c shows the wave-front parts that are generated in later loops through the region growing processing. At one iteration through the region growing loop, the wave-front surface is represented by wave-front parts 393, and 395. At this stage of processing, wave-front parts 386, 387, 389, 391, and 392, from the previous iteration, have not initiated any new wave-front parts and the corresponding voxel are inactive. At a later iteration, wave-front parts 394 and 396 represent the only active portions of the wave-front surface. FIG. 5d is a diagram that shows all of the wave-fronts generated as part of the region growing processing.

The wave-front parts 384, 385, 392, 393, and 394 represent a single wave-front path. Similarly, wave-front parts 384, 385, 388, 395, and 396 represent a different wave-front path.

Region growing methods, in general, start with a seed point (single point) or a set of points, and add new points to the classified region that meet a growth criteria as well as the condition of begin adjacent. Connectivity can be defined in many different ways. The technology of the present invention can be used with a variety of different adjacency criteria depending on the needs of the application. The simplest connectivity criteria includes the voxels, about a voxel $v_{i,j,k}$, that are one index different in one of the three cardinal directions. Let the indices i, j, and k refer to the x, y, and z-directions respectively. With this simple definition of connectivity, the following six voxels are considered connected $v_{i+1,j,k}$, $v_{i-1,j,k}$, $v_{i,j+1,k}$, $v_{i,j-1,k}$, $v_{i,j,k+1}$, and, $v_{i,j,k-1}$. For a 2-dimensional application there would only be the four connected voxels $v_{i+1,j}$, $v_{i-1,j}$, $v_{i,j+1}$ and, $v_{i,j-1}$ with this simple criterion. Other connectivity criteria can include the eight corner voxels about the a voxel $v_{i,j,k}$, e.g. $v_{i+1,j+1,k+1}$, $v_{i+1,j+1,k-1}$, $v_{i+1,j-1,k+1}$, $v_{i-1,j+1,k+1}$, $v_{i+1,j-1,k-1}$, $v_{i-1,j+1,k-1}$, $v_{i-1,j-1,k+1}$, and $v_{i-1,j-1,k-1}$. Still further, there can be as many as 26 connected voxels to voxel $v_{i,j,k}$ if all of the voxels within one index of i,j,k are considered. Thus, the present invention can be used with many definitions of connectivity. However, with fewer connected voxels considered, some diagonally connected structures can be omitted in the region growing process. In general, there is a trade-off between computational efficiency and region growing integrity.

On the first pass through the loop of steps 312, 313, and 314, a continue propagation? step 316 (FIG. 4) is encountered that determines if another iteration through the loop of steps should be processed. One way the processing can finish is if there are no active voxels in the current wave-front surface. The loop processing within the initial object segmentor 310 can also stop if the total distance of the path-length from the seed point 205a to an active voxel has exceeded a predetermined parameter value contained in the image processing parameters 206. When the loop processing has finished, the current segmentation map becomes the initial segmentation map 203.

In an alternative embodiment, an analyze each active wave-front path step 315 (FIG. 4), is performed as a step within the initial object segmentor 310. This step invokes a combination of the wave-front path analyzer 320 and segment map pruner 330 shown in FIG. 3 and will be described in more detail below. Although, the preferred embodiment performs the analysis and pruning operations after the initial segment map 203 is complete, step 315 can be performed within the region growing processing loop. As such, the pruning operation performed by the segment map pruner 330 must alter the current segmentation map, the set of active voxels, etc.

Pulmonary lesions can be classified into different types of lesions by their juxta-position to normal anatomy. The lungs can a variety of normal tissue structures that are discernable when investigating a CT or MR volume image. For example, the normal lung parenchyma tissue appears as dark (voxel values typically in the range of −700 to −1000 Hounsfield units (HU)) featureless regions. Blood vessels, arteries and veins, appear as meandering tubes with voxel values varying in value depending on the diameter of the vessel. Due to partial volume effects, thinner diameter vessels, on CT exams, will have lower values typically in the −700 to −500 range. Larger diameter bronchia appear as hollow tubes with the thinnest bronchia appearing much like blood vessels. The lung parenchyma is border by adjacent structures such as the chest wall, heart, and diaphragm.

Some pulmonary lesions grow in the midst of the lung parenchyma without perceivably intersecting any of the above mentioned normal anatomy structures. This type of pulmonary lesion can be termed "circumscribed" since the lesion is essentially self-contained. Although a circumscribed lesion does not intersect with a normal anatomy structure, it still can be irregular in shape and contain spiculated tentacles, i.e., thin tapering lesion structures. Spiculated structures typically taper to a point, however, some taper and then connect to secondary lesion dislocated from the primary. Juxta-vascular lesions within the lung parenchyma next to and sometimes encompassing a vessel. Juxta-pleura lesions grow within the lung parenchyma next to the pulmonary parietal pleural membrane, i.e., the pulmonary parietal pleural membrane that encompasses the lungs. Since the pulmonary parietal pleural membrane itself is not always discernable, these lesions appear to grow next to the normal structure on the other side of the pulmonary parietal pleural membrane such as the heart, diaphragm, or chest wall. Juxta-pleural lesions can be further typed as either sessile or pedunculated. Pedunculated juxta-pleural have a pedicle, or tentacle-like structure that connects the main part of the lesion to the pulmonary parietal pleural membrane. Sessile juxta-pleural lesions have no discernable pedicle and appear to grow as a protuberance from the pulmonary parietal pleural membrane.

The above mentioned lesion types have similar voxel value ranges for the voxels that are part of the lesion. Typically, the lesion tissue has similar properties to fat and soft tissue (solid with no voids) with corresponding voxels values on CT exams ranging from −500 to +100 HU. Lesions can also exhibit calcified sub-structures, and therefore, can have CT voxel values that exceed +100 HU. In addition to the above mentioned lesion types, there is a non-solid lesion type that exhibits quite different properties owing to a much reduced opacity. For the non-solid lesion type, the voxel values are relatively close to that of the surrounding lung parenchyma at about −750 to −600 HU. In fact, the non-solid lesions are sometime difficult for observers to visualize.

Figure 6A:
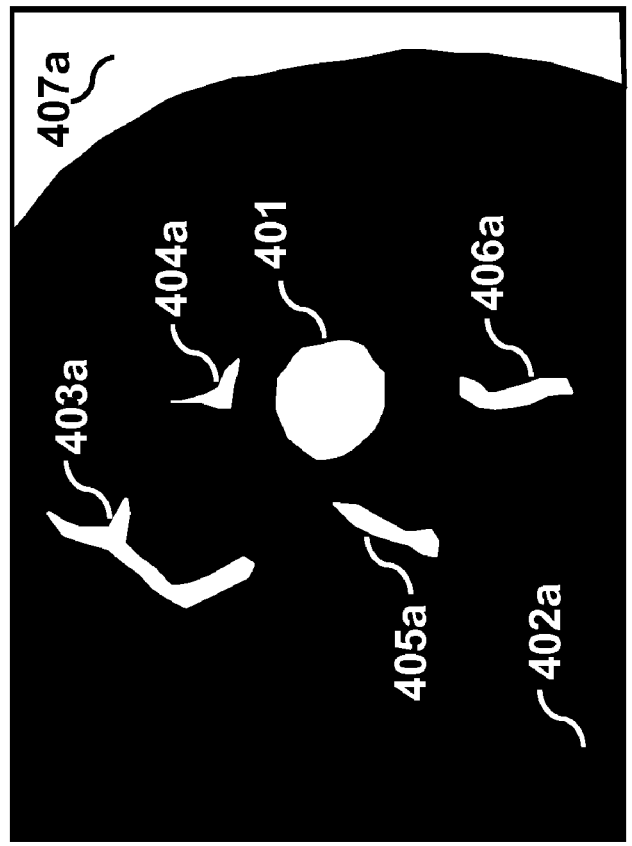
FIG. 6a depicts a circumscribed lesion.
Figure 6B:
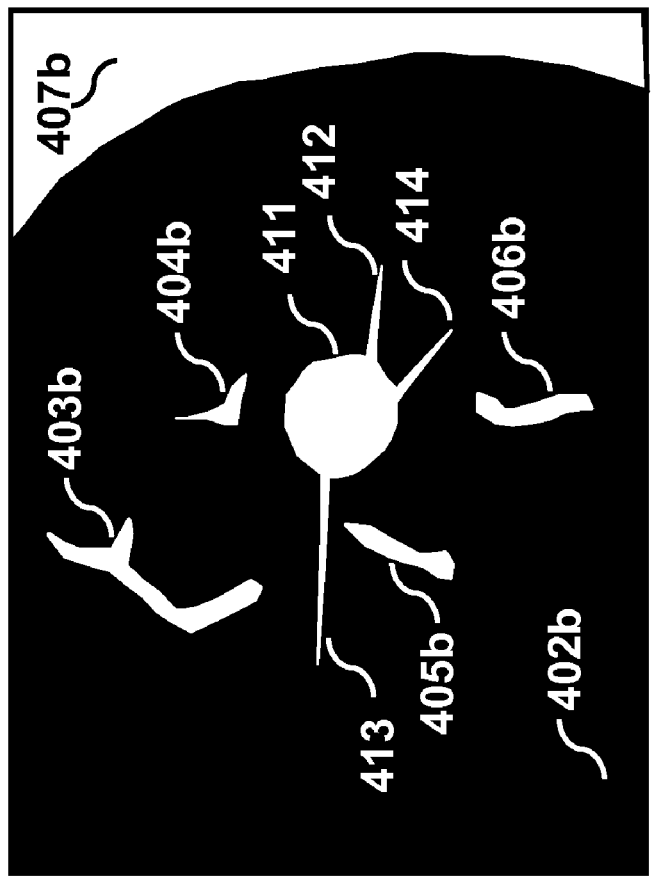
FIG. 6b depicts a circumscribed lesion with spiculations.
Figure 6C:
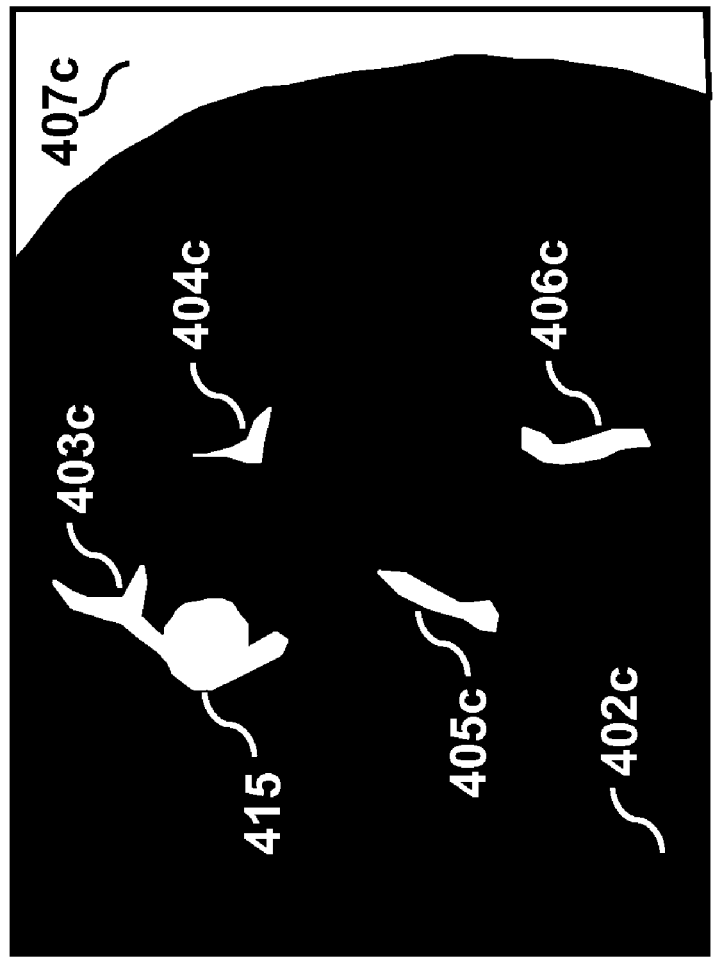
FIG. 6c depicts a juxta-vascular lesion.
Figure 6D:
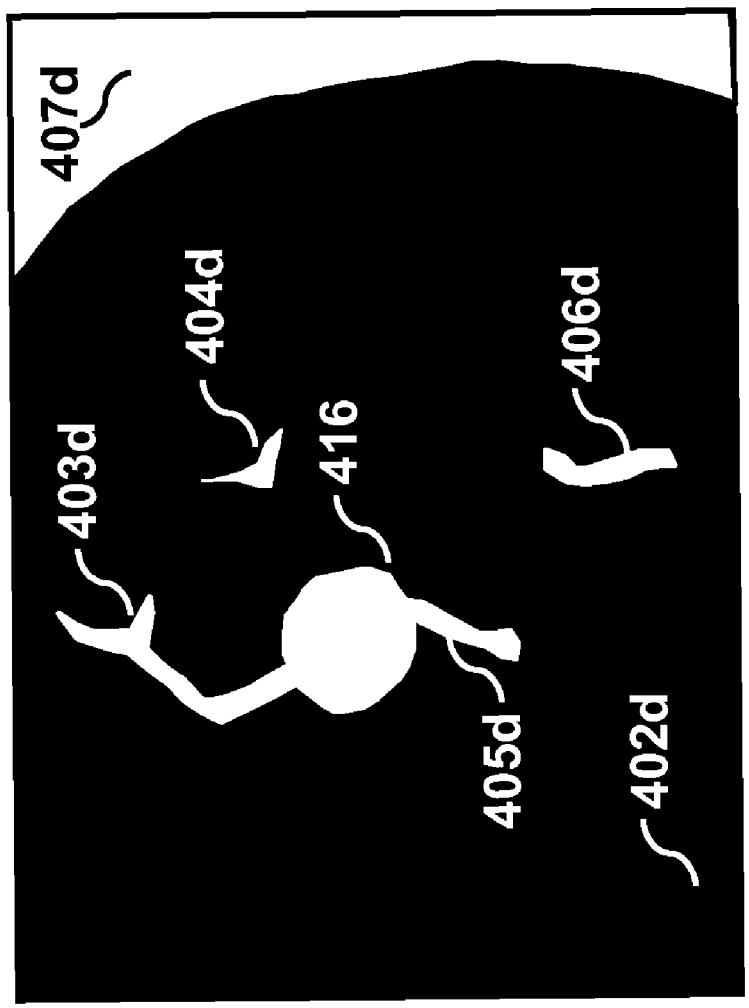
FIG. 6d depicts a juxta-vascular lesion growing around vessels.
Figure 6E:
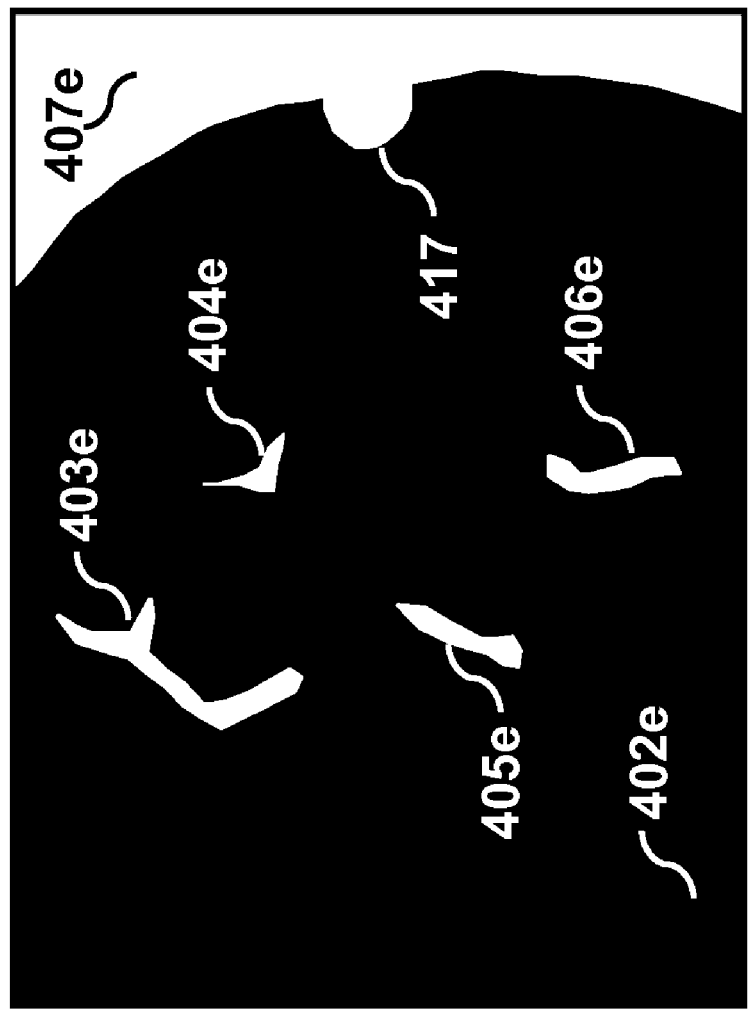
FIG. 6e depicts a sessile juxta-pleural lesion.
Figure 6F:
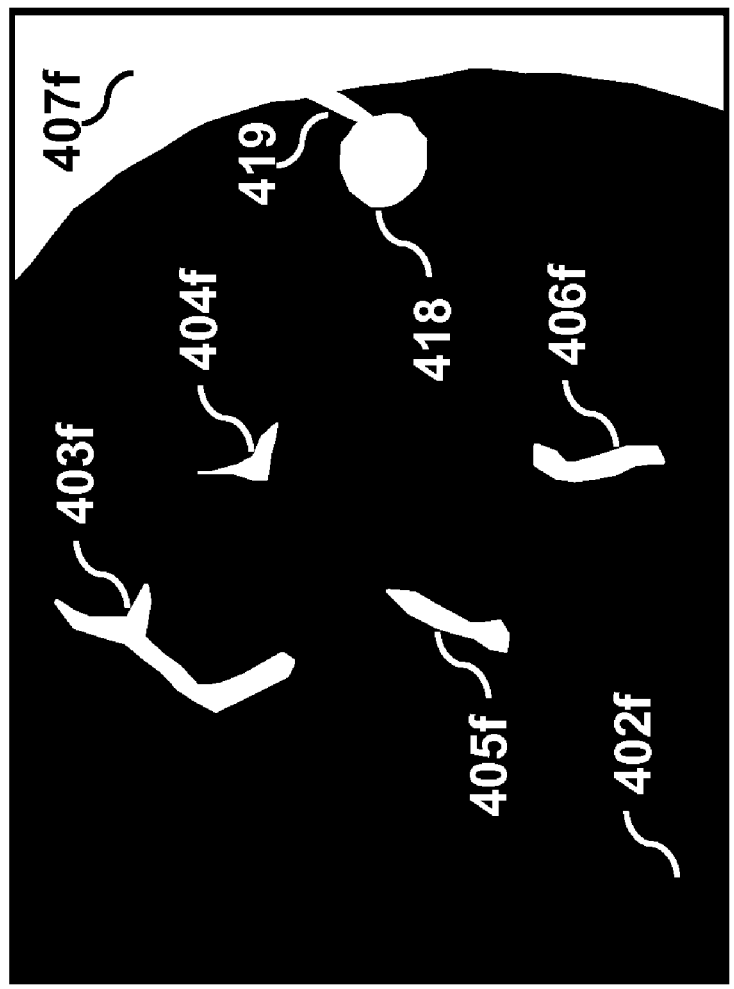
FIG. 6f depicts a pedunculated juxta-pleural lesion.

In the diagrams FIG. 6a, through FIG. 6f, the chest wall is shown as 407a, 407b, 407c, 407d, 407e, and 407f respectively. Similarly, in the diagrams FIG. 6a, through FIG. 6f, the lung parenchyma is shown as 402a, 402b, 402c, 402d, 402e, and 402f respectively. In the diagrams FIG. 6a, through FIG. 6f, the same vessel is shown as 403a, 403b, 403c, 403d, 403e, and 403f respectively. In the diagrams FIG. 6a, through FIG. 6f, a different vessel is shown as 404a, 404b, 404c, 404d, 404e, and 404f respectively. In the diagrams FIG. 6a, through FIG. 6f, another vessel is shown as 405a, 405b, 405c, 405d, 405e, and 405f respectively. In the diagrams FIG. 6a, through FIG. 6f, another vessel is shown as 406a, 406b, 406c, 406d, 406e, and 406f respectively. FIG. 6a depicts a circumscribed lesion 401. FIG. 6b depicts a circumscribed lesion 411 with spiculated tentacles 412, 413, and 414. FIG. 6c depicts a juxta-vascular lesion 415, wherein the lesion is intersecting with vessel 403c. FIG. 6d depicts a juxta-vascular lesion 416 growing around vessels 403d and 405d. FIG. 6e depicts a sessile juxta-pleural lesion 417. FIG. 6f depicts a pedunculated juxta-pleural lesion 418 with pedicle 419.

For illustrative purposes, the FIGS. 6a, through 6e depict the various anatomical structures in 2-dimensional black and white (two levels). In reality, the presented structures exhibit a range of voxel values. Although it can be readily apparent to a human observer that a lesion structure intersects with, for example, the chest wall, many volume images present no change in voxel value at the boundary of such an intersection, i.e., there is no perceivable border delineating the structures. This aspect of the volume image data presents a formidable challenge to the image segmentation software.

Referring to FIG. 3, the wave-front paths 208 generated by the initial object segmentor 310 are analyzed for structural characteristics by the wave-front path analyzer 320. There are many types of pulmonary lesions that can be distinguished by the analysis of the wave-front parts of the wave-front paths 208. As described above, a wave-front path can have multiple wave-front parts generated from the succession of region growing processing iterations. In two such examples n described above (see FIGS. 5a through 5d), wave-front parts 384, 385, 392, 393, and 394 representing a single wave-front path for a sessile juxta-pleural lesion type and wave-front parts 384, 385, 388, 395, and 396 representing a wave-front path for a spiculated tentacle.

Features for each wave-front part k and the volume associated with each wave-front part can be computed, such as, the number of voxels $N_k$, the center of gravity (centroid) $C_k$, shape and orientation, direction between successive wavefronts parts, curvature, etc. The centroid of a wave-front part is defined as $$C_k = \frac{1}{N_k} \sum_i X_i$$

where $X_i$ is the coordinate of the $i^{th}$ voxel in wave front part k. The direction between successive wave front parts is defined as $$D_k = C_{k+1} - C_k$$

and the curvature is defined as $$\kappa_k = |D_k - D_{k-1}|.$$

The shape and orientation of the $k^{th}$ wave-front part can be determined by the eigenvalues and eigenvectors of the covariance matrix of the voxels spatial coordinates X that makeup the $k^{th}$ wave-front part. The eigenvectors yield the orientation or principal axes of the front and eigenvectors yield information related to the shape of the front. For example, if eigenvalues $\lambda$ are ordered in magnitude such that $\lambda_1 \leq \lambda_2 \leq \lambda_3$, then a front associated with a vessel is indicated by $\lambda_1$ being small (ideally zero), and $\lambda_2$ and $\lambda_3$ are of larger and equal magnitude. The respective eigenvectors $u_1$ indicates the direction along the vessel and $u_2$ and $u_3$ form the normal (orthogonal) plane.

Figure 7:
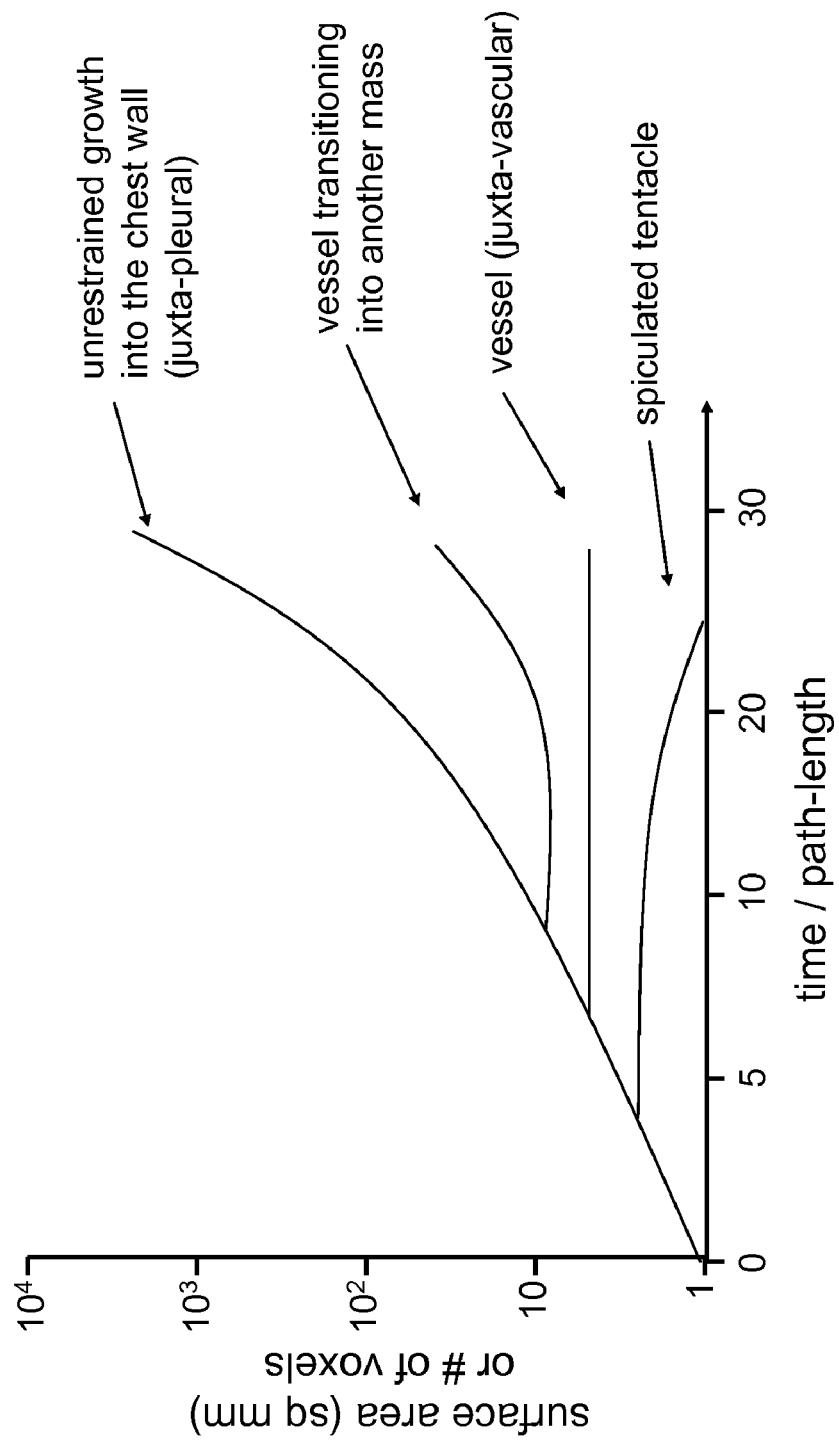
FIG. 7 shows a graph of the number of voxels as a function of path length for different idealized lesion types.

The computed features associated with each wave-front part can then be used to analyze the anatomical structures associated with the lesion and normal anatomy within the medical digital image. FIG. 7 shows a graph of the number of voxels included in a wave-front part for successive wave-front parts of a single wave-front path. For isotropically sampled voxel data, the number of voxels relates directly to the surface area of a wave-front part when the wave-front is traveling along one of the cardinal directions. For wave-front surfaces traveling at an oblique angle, the surface area can be calculated by accounting for the direction of the surface normal. In similar manner, the surface area can also be calculated for wave-front parts derived from anisotropically sampled voxel data.

It should be noted that the calculation of surface normal vectors can be computationally intensive and somewhat inexact. This is mostly due to noise in the capture system and course spatial sampling relative to the anatomical structures of interest. For isotropically and anisotropically sampled voxel data, the number of voxels contained in a wave-front part can be considered a surrogate for surface area. For many cases, any of measure of wave-front part surface area plotted for successive wave propagation steps reveals much about the underlying anatomical structure.

Idealized plots for four different anatomical structures are shown in FIG. 7. In the sessile juxta-pleural lesion type example given above, the advancing wave-front path that penetrates into the chest wall or similar structure, e.g. the diaphragm or heart, has a progression of surface area values that increases substantially as a function of path-length (distance from the seed point 205b, see FIG. 5a). The simplest method for distinguishing different types of wave-front part from the other types includes using thresholds, range limits, and trend lengths on the number of voxels/amount of surface area. An alternative method involves analyzing the number of voxels in the wave-front path to determine the rate of change in the number of voxels as a function of the path-length. An unrestrained wave-front surface will have a corresponding surface area progression that varies approximately as the distance squared. This situation can happen if a seed point is located within a solid mass.

Another anatomical structure that can be differentiated by analyzing the properties of the wave-front is a spiculated tentacle. As shown in the graph depicted in FIG. 7, the surface area, or number of voxels, of the progression diminishes with path-length until, eventually, the progression terminates. Most spiculated tentacles vanish in just a few voxels length (corresponding roughly to about 3 to 5 mm). However, spiculated tentacles greater that 20 mm were observed.

Conversely, vessels tend to have corresponding progressions of surface area that are relatively constant as a function of path-length. Additionally, larger vessels have correspondingly greater number of voxels and larger surface area values. The surface area of the wave-front parts that correspond to vessels essentially represents the cross-sectional area of the vessel since the wave-front surface progression tends to follow the axis of vessels. Therefore, medium to larger size vessels can be differentiated from other anatomical structure types by virtue of having approximately constant surface area and surface area values above approximately 20 mm², or about 5 mm in diameter. (Similarly, the square root of the number of voxels or the square root of the surface area can be used as an effective structure diameter when analyzing the wave-front parts). By observation, most spiculated tentacles have smaller corresponding surface area values associated with their respective wave-front parts.

Lesions, especially cancerous lesions, can grow along vessels and form spiculated tentacles that connect to another lesion. For these cases, it can be difficult to ascertain which lesion is the primary and secondary or if both lesions should be considered a single lesion. When a lesion is connected to another structure, e.g. another lesion, the chest wall or heart, the progression of surface area values, or number of voxels, can initially diminish as a function of path-length and then increase. The increase in the surface area value corresponds to the wave-front surface passing the intersection point with a different anatomical structure. If the wave-front parts of a wave-front path progress along a vessel, the corresponding surface area values can stay relatively constant (when in the vessel) and then increase when a larger anatomical structure is intersected as shown in the graph of FIG. 7. For the case of a pedunculated juxta-pleural lesion, the progression of surface area values corresponding to the pedicle structure (see 419 of FIG. 6f) can be constant, diminish, diminish and then increase, or just increase. However, when the corresponding wave-front part progresses past the intersection with the chest wall, the progression embarks on the squared distance relationship as described above.

The wave-front paths, or sections of a given wave-front path, are classified by the manifestation of predetermined relationships between successive wave-front parts of a given wave-front path. For several of the case types described above, not all of the wave-front parts of a wave-front path correspond to a single anatomical structure. Therefore, each of the wave-front parts of a wave-front path must be given a structural classification. For example, the wave-front parts of wave-front paths identified as spiculated tentacles, can all be classified as spiculated tentacle type.

Vessel-like structures can be identified by examining a plot of the surface area, or number of voxels, in a wave-front part as a function of successive wave-front parts of a wave-front path (see FIG. 7). Characteristically, the wave-front surface area for vessel-like structures is approximately constant (for a minimum given path length) and for surface area values below a predetermined value (depending of the selected diameter of the vessel). In addition, the vessel-like structures can further be identified by examining the shape parameters and directions for each wave-front part for consistency between each wave-front part and consistency with a prior vessel model.

Spiculated tentacle-like structures can be identified in a similar manner characterized by a diminishing progression of wave-front part surface area over a relatively short length with termination. The wave-front parts that occur before (i.e., closer to the seed point 205a) identified vessel-like structures are classified as lesion type. The wave-front parts that occur after (i.e., further from the seed point 205a) identified vessel-like structures are unclassified and can be removed from the segmentation map.

Lesions that are attached to large normal structures, such as the pleural wall, heart, or mediastinum, are identified by looking for wave-front paths that have a progression of wave-front part surface area that increases at a large rate for a relatively long path length (see FIG. 7). When a wave-front part progresses to the stage that it includes roughly 1000 voxels (approximately 300 to 500 mm²), it is very likely that the wave-front part has intersected with a large anatomical structure. Once this type of wave-front path is identified, it is necessary to determine where (i.e., which wave-front part) the intersection has occurred between the lesion and large anatomical structure. In many instances it has been observed that when the wave-front penetrates a large anatomical structure that the ratio of the number of voxels (or calculated surface area) in successive wave-front parts is greater than would be expected based upon a squared distance relationship. The wave-front parts that occur before (closer to the seed point) the identified large anatomical structure are classified as lesion type. The wave-front parts that occur after the large anatomical structure are classified as normal anatomy and can be removed from the segmentation map. If deemed necessary more sophisticated methods can be used to demark the boundary between the lesion and normal anatomy. For example, the intersection points between the identified wave-front part and the boundary between anatomical structure and lung parenchyma can be identified and used to fit a 3D plane. The wave-front parts and voxels that occur on the side of the plane containing the seed point are classified as lesion type. The wave-front parts and that occur on the side of the plane not containing the seed point are classified as normal anatomy and can be removed from the segmentation map.

Alternatively, for the pedunculated juxta-pleural lesion type wave-front paths, the end of the pedicle structure must be defined. The preferred method uses the minimum surface area value $S_m$ as the pinching point. The wave-front parts that have corresponding surface area values greater further away from to the seed point 205a than $S_m$ are unclassified and removed from the segmentation map. Alternatively, the pinching point can be determined by calculating the corresponding wave-front part that has a surface area value greater than $S_m+\tau_2$ (another small tolerance) and is further away from the seed point 205 then the wave-front part corresponding to $S_m$. Good values for the small threshold values $\tau_1$ and $\tau_2$ are in the range from 1 to 2 mm². However, these values can be set to a particular radiologist's preference.

Human anatomy exhibits great variation. Therefore, the above-described distinguishing characteristic progressions of surface area values should be considered guidelines rather than definitive, i.e., there will always be some anatomical structure classification errors. However, each of the above mentioned types of anatomical structural intersections do have distinguishable patterns. Thus, the following lesion types can be differentiated: circumscribed, juxta-vascular, juxta-pleural, pedunculated juxta-pleural, sessile juxta-pleural, and circumscribed spiculated. Additionally, a particular wave-front path can be distinguished as a lesion (distance squared progression about the seed point), vessel (relatively constant surface area progression), spiculated tentacle (diminishing progression of surface area values and relatively short length with termination), and large structure (distance squared progression of surface area).

Referring to FIG. 3, the initial segmentation map 203 and wave-front paths 208 are received by the segmentation map pruner 330 that generates the final form segmentation map, i.e., the lesion segmentation map 204. The wave-front path analyzer 320 provides the necessary classification information for each wave-front part as meta-data included with the wave-front paths 208. The pruning operation performed by the segmentation map pruner 330 involves pruning, or omitting, voxels from the initial segmentation map 203 that are identified with wave-front parts classified as vessels. Therefore, the lesion is segmented by removing the anatomical structures associated with the normal anatomy. For circumscribed lesion types, there may be no pruning necessary. Wave-front parts classified as spiculated tentacles are preferentially retained in the lesion segmentation map 204. Alternatively, the wave-front parts that have been classified as spiculated tentacles can also be pruned if it is desired to define the lesion as the solid round part of the overall lesion. Alternatively, for circumscribed spiculated lesion types, only the voxels associated with spiculated tentacles are retained in the lesion segmentation map 204. For this alternative, the corresponding reported volume 207 will relate to the volume of the all the identified spiculated tentacles.

Alternatively, the segmentation map pruner 330 can employ a morphological filter to perform some of the pruning. For example, a morphological filtration closing operation, i.e., an erosion followed by a dilation operation, can be performed on only the voxels of the initial segmentation map 203 that area associated with wave-front parts classified as vessels. The same morphological filtering can be performed selectively for the case of pedunculated juxta-pleural classified wave-front parts.

The present invention can be used with different image processing region growing method. The preferred embodiment employs a version of the Fast-Marching method described by J. A. Sethian in the publication "Level Set Methods and Fast Marching Methods", Cambridge University Press, 1999. The fast-marching approach is a one-voxel-at-a-time approach wave-front propagation technique. Starting with a seed point (single point), a set of point such as a line, or a surface of points, connected voxels are either added to the segmentation map or classified as not-part of the segmented object based on a cost-function criterion. Many different cost-function criteria can be used in the context of a fast-marching approach. For example, the cost-function can be based on the magnitude of the gradient of voxel values. Another cost-function can be based on the curvature of surface normal vectors. Additionally, any combination of cost-functions can serve as cost-function. The preferred embodiment uses a cost-function based on the voxel value and a constant threshold. The cost function returns 1 for voxels whose value is above the threshold and returns infinity for voxels whose value is below or equal to the threshold. By choosing a cost function that returns infinity for a voxel value below the threshold inactivates or freezes the growing front at that voxel. This type of cost function yields a geodesic distance map that associates each nodule voxel with its geodesic distance from the seed point. For example, a threshold value of −350 HU works well for segmenting solid-type pulmonary lesions. However, the cost-function threshold value (included in the image processing parameters 206 of FIG. 4) can be a parameter that is application specific or even preferentially set for an individual radiologist. Alternatively, the threshold can be automatically determined by an algorithmic method. For example, the threshold can be determined either by analyzing traces of the voxels values that originate at the seed point and extend in different directions through the nodule to the background (lung parenchyma) or by histogram analysis of voxel values in a bounding volume about the seed point that is large enough to include the both nodule and background.

Those skilled in the art will recognize that there are many different algorithms that can be used to calculate a geodesic distance map or a cost weight variant of geodesic distance map that can be used in the current invention.

Those skilled in the art will recognize that the level set method approach described by J. A. Sethian can also be used with the present invention. The level set method a many-at-once wave-front surface progression method that can incorporate more mathematically complex cost-functions (with a corresponding increase in required computational resources).

Those skilled in the art will recognize that the simple case of a voxel threshold value based cost-function can be implemented with a modified connected component algorithm. That is, a connected component algorithm as described above, can be governed by connectivity and comparison to the voxel threshold value.

Although the technology described herein was developed and tested with volumetric patient images with the intent of segmented pulmonary lesions, those skilled in the art will appreciate that the general processes described herein can be used to segment anatomical features other than pulmonary lesions. For example, liver lesions have many geometric similarities to pulmonary lesions. However, it should be recognized that although the principles of the present invention can be applied to other domains, the particular logic and control parameters would most likely be application specific.

Those skilled in the art will recognize that although the present invention has been described in the context of segmenting and analyzing pulmonary lesions, the technology can be used to segment and analyze lesions in other organs of the body as well. For example, hepatic lesions grow in and around blood vessels and against other normal anatomical structures adjacent to the liver.

Although the present invention was primarily motivated by a medical digital imaging application, those skilled in the art will recognize that the technology described herein can be practiced with non-medical digital imaging applications. A non-medical application for which the present invention is well suited is non-destructive testing using x-ray sources. As long as the imaged objects have differentiated geometric shapes, the wave-front analysis approach described herein is applicable. For this generalized application, the differentiation is not between normal an abnormal tissue, it is between objects of dissimilar shape. For example, tube-like structures are akin to the vessel-like structures described above. Broad objects with low curvature, i.e., relatively flat, are akin to the chest wall as described above.

Although the present invention was primarily motivated by a 3-dimensional medical digital imaging application, those skilled in the art will recognize that the technology described herein is applicable to 2-dimensional image analysis applications as well. Most region growing techniques, and the Fast Marching technique in particular, have a corresponding 2-dimensional formulation. For example, the above 3-dimensional technology can also be applied to a single CT slice, i.e., a 2-dimensional entity. For 2-dimensional imaging applications, a wave-front surface is really a curve, i.e., a connected set of points that lie in a plane. Thus for the purposes of the discussion herein, the term "surface" also include "curves" for 2-dimensional applications.

The image processing operations depicted in the description above can be implemented and stored as a computer program stored in a computer readable storage medium. The computer readable storage medium can include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program. It is also possible to embed a software implementation of the present invention on an electronic circuit.

The invention has been described in detail with particular reference to certain preferred embodiments thereof, but it will be understood that variations and modifications can be effected within the spirit and scope of the invention.

PARTS LIST 10a image capture device
10b image capture device
42a electronic display device
42b electronic display device
44a input control device
44b input control device
60 mobile computer
110 communications network
120 diagnostic workstation computer
140 image archive computer
150 software application program
201 source digital images
202 volume image
203 initial segmentation map
204 lesion segmentation map
205a seed point
205b seed point
206 image processing parameters
207 reported volume
208 wave-front paths
209 rendered segmentation map
220 slice image assembler
230 lesion segmentor
240 image renderer
250 volume estimator
310 initial object segmentor
312 propagate the wave-front step
313 classify the wave-front surface into active and inactive parts step
314 classify the active wave-front part into separate active parts step
315 analyze each active wave-front path step
316 continue propagation? step
320 wave-front path analyzer
330 segment map pruner
381a, 381b, 381c, 381d chest wall
382a, 382b, 382c, 382d lung parenchyma
383a, 383b, 383c, 383d pulmonary parietal pleural membrane
384 wavefront part
385 wavefront part
386 wavefront part
387 wavefront part
388 wavefront part
389 wavefront part
391 wavefront part
329 wavefront part
393 wavefront part
394 wavefront part
395 wavefront part
396 wavefront part
401 circumscribed lesion 401
402a, 402b, 402c, 402d, 402e, and 402f lung parenchyma
493a, 403b, 403c, 403d, 403e, and 403f vessel
404a, 404b, 404c, 404d, 404e, and 404f vessel
405a, 405b, 405c, 405d, 405e, and 405f vessel
405a, 405b, 405c, 405d, 405e, and 405f vessel
407a, 407b, 407c, 407d, 407e, and 407f chest wall
411 circumscribed lesion
412, 413, 414 spiculated tentacles
415 juxta-vascular lesion
416 juxta-vascular lesion
417 sessile juxta-pleural lesion
418 pedunculated juxta-pleural lesion
419 pedicle

The invention claimed is:

1. A method of analyzing a lesion in a medical digital image using a processor using at least one point contained within a lesion to be analyzed comprising:
    (a) propagating a wave-front surface from the at least one point for a plurality of steps;
    (b) partitioning the wave-front surface into a plurality of wave-front parts wherein each wave-front part is associated with a different portion of the wave-front surface corresponding to a previous propagation step; and
    (c) analyzing at least one feature associated with each wave-front part to classify anatomical structures associated with the lesion and normal anatomy within the medical digital image.

2. The method of claim 1, further including using the classification information corresponding to the anatomical structures to segment the lesion part of the medical digital image; and using the segmented lesion part to calculate an estimated volume for the lesion.

3. The method of claim 1, wherein the at least one point includes a single point, a line, a surface, a volume, or a plurality of points.

4. The method of claim 3, wherein the at least one point is identified by a user.

5. The method of claim 3, wherein the at least one point is identified automatically determined by an algorithmic method.

6. The method of claim 1, wherein the wave-front surface is propagated simultaneously while performing step (b).

7. The method of claim 1, wherein a wave-front path is determined between successive wave-front parts from a plurality of wave-front surfaces.

8. The method of claim 7 wherein step (c) is performed using the wave-front path.

9. The method of claim 7 including determining the digital image elements associated with the wave-front path that lie between successive wave-front parts and associating those digital image elements with one of the wave-front parts.

10. The method of claim 1 wherein the classified anatomical structures include the lesion or spiculated tentacles, and the normal anatomical features include vessels, heart, or chest wall.

11. The method of claim 1 wherein the calculated feature of the wave-front parts includes: the number of digital image elements, surface area, curvature, orientation, or shape.

12. The method of claim 1 further including:
    (d) segmenting the lesion by removing the anatomical structures associated with the normal anatomy.

13. A method of analyzing an object in a non-medical digital image using a processor using at least one point contained within an object to be analyzed comprising:
    (a) propagating a wave-front surface from the at least one point for a plurality of steps;
    (b) partitioning the wave-front surface into a plurality of wave-front parts wherein each wave-front part is associated with a different portion of the wave-front surface corresponding to a previous propagation step; and
    (c) analyzing at least one feature associated with each wave-front part to classify structures associated with the object within the non-medical digital image.

14. A method of analyzing a lesion in a medical digital image using a processor using at least one point contained within a lesion to be analyzed comprising:
(a) using the at least one point to segment the medical digital image into a first segmentation part associated with the lesion and normal anatomy structures and a second part associated with background anatomical structures;
(b) determining a surface associated with the first segmentation part;
(c) partitioning the surface into a plurality of surface parts; and
(d) analyzing at least one feature associated with each surface part to classify the anatomical structures associated with the lesion and normal anatomy within the medical digital image.

15. A method of analyzing a lesion in a medical digital image using a processor using at least one point contained within a lesion to be analyzed comprising:
(a) growing regions from the at least one point for in a plurality of steps;
(b) partitioning the surface of each region into a plurality of surface parts wherein each surface part is associated with a different portion of the region surface corresponding to a different region surface; and
(c) analyzing at least one feature associated with each surface part to classify anatomical structures associated with the lesion and normal anatomy within the medical digital image.

16. The method of claim 15 wherein the region growing is performed by a wave-front propagation.

* * * * *